US007667716B1

(12) United States Patent
Nishiura

(10) Patent No.: US 7,667,716 B1
(45) Date of Patent: Feb. 23, 2010

(54) APPARATUS AND METHOD FOR CONVERTING AN OBJECT DISPLAY DESCRIPTION DOCUMENT

(75) Inventor: Sachiko Nishiura, Tokyo (JP)

(73) Assignee: NEC Corporation, Tokyo (JP)

( * ) Notice: Subject to any disclaimer, the term of this patent is extended or adjusted under 35 U.S.C. 154(b) by 1319 days.

(21) Appl. No.: 09/454,755

(22) Filed: Dec. 6, 1999

(30) Foreign Application Priority Data

Dec. 9, 1998 (JP) ................................. 10-350290

(51) Int. Cl.
G09G 5/00 (2006.01)
G06T 15/40 (2006.01)
(52) U.S. Cl. ...................................... 345/631; 345/421
(58) Field of Classification Search ................. 345/631, 345/629, 553, 421, 422, 473, 474, 475
See application file for complete search history.

(56) References Cited

U.S. PATENT DOCUMENTS

| 4,594,673 | A | * | 6/1986 | Holly ........................... 345/419 |
| 4,924,414 | A | * | 5/1990 | Ueda ............................ 345/421 |
| 5,084,830 | A | * | 1/1992 | Doornink et al. ............. 345/419 |
| 5,086,496 | A | * | 2/1992 | Mulmuley ................... 345/421 |
| 5,088,054 | A | * | 2/1992 | Paris, II ........................ 345/419 |
| 5,125,074 | A | * | 6/1992 | Labeaute et al. ............. 345/421 |
| 5,386,505 | A | * | 1/1995 | Beattie et al. ................ 345/629 |
| 5,388,192 | A | * | 2/1995 | Ohsawa et al. ............... 345/634 |
| 5,448,686 | A | * | 9/1995 | Borrel et al. ................. 345/420 |
| 5,463,728 | A | * | 10/1995 | Blahut et al. ................ 345/629 |
| 5,559,950 | A | * | 9/1996 | Cannon ........................ 345/501 |
| 5,574,835 | A | * | 11/1996 | Duluk et al. ................. 345/421 |
| 5,583,542 | A | * | 12/1996 | Capps et al. ................. 345/173 |
| 5,600,831 | A | * | 2/1997 | Levy et al. ..................... 706/45 |
| 5,606,651 | A | * | 2/1997 | Brown et al. ................. 345/621 |
| 5,615,322 | A | * | 3/1997 | Murata et al. ................ 345/419 |
| 5,640,496 | A | * | 6/1997 | Hardy et al. ................. 345/421 |
| 5,692,117 | A | * | 11/1997 | Berend et al. ............... 345/475 |
| 5,768,578 | A | * | 6/1998 | Kirk et al. ..................... 707/100 |
| 5,802,211 | A | * | 9/1998 | King ............................ 382/236 |
| 5,864,342 | A | * | 1/1999 | Kajiya et al. ................ 345/418 |
| 5,926,185 | A | * | 7/1999 | Vyncke et al. .............. 345/619 |
| 5,990,904 | A | * | 11/1999 | Griffin ........................ 345/631 |
| 6,052,125 | A | * | 4/2000 | Gardiner et al. ............. 345/421 |
| 6,069,633 | A | * | 5/2000 | Apparao et al. ............. 345/421 |
| 6,125,323 | A | * | 9/2000 | Nimura et al. .............. 340/988 |
| 6,144,388 | A | * | 11/2000 | Bornstein .................... 345/629 |
| 6,144,972 | A | * | 11/2000 | Abe et al. .................... 345/475 |
| 6,191,797 | B1 | * | 2/2001 | Politis ........................ 345/420 |

(Continued)

FOREIGN PATENT DOCUMENTS

EP 0737930 * 10/1996

(Continued)

*Primary Examiner*—Ryan R Yang
(74) *Attorney, Agent, or Firm*—Michael Best & Friedrich LLP

(57) ABSTRACT

There is provided an apparatus for converting an object display description document, which enables to reduce load for displaying an image and a capacity necessary for storing document data. A browser including the apparatus is also provided. The apparatus comprises a generating means for generating, from a set of source objects in a document, a set of new objects to obtain a display image equivalent to a display image obtained from the set of source objects. The new objects are fewer than the set of source objects.

27 Claims, 10 Drawing Sheets

| OPTIMIZATION ANALYSIS CONTENTS | METHOD AND PROCESS NUMBERS |
|---|---|
| 1. PLURAL OBJECTS SUPERIMPOSE, DISPLAY TIMES FOR OTHER OBJECTS ARE COMPLETELY INCLUDED WITHIN A DISPLAY TIME FOR THE UPPER MOST OBJECT, A SIZE OF THE UPPER MOST OBJECT IS LARGER THAN SIZES OF OTHER OBJECTS, AND THE UPPER MOST OBJECT HIDES OTHER OBJECTS EVEN CONSIDERING DISPLAY LOCATIONS | |
| 1-1. THE UPPER MOST OBJECT IS NOT TRANSPARENT NOR TRANSLUCENT | PROCESS 1 FOR OTHER OBJECTS |
| 1-2. IF THE UPPER MOST OBJECT IS TRANSPARENT OR TRANSLUCENT, THEN REMOVING THE UPPER MOST OBJECT AND ANALYZING THE ANALYSIS CONTENTS 1 FOR THE REMAINING PLURAL OBJECTS | |
| 2. PLURAL OBJECTS SUPERIMPOSE IN TIME AND SPATIALLY, AND THE UPPER MOST OBJECT IS TRANSPARENT OR TRANSLUCENT | |
| 2-1. A MOTION PICTURE IS CONTAINED | PROCESS 2 FOR ALL OBJECTS OVER THE ENTIRE SUPERIMPOSING TIME |
| 2-2. NO MOTION PICTURE IS CONTAINED | PROCESS 3 FOR ALL OBJECTS OVER THE ENTIRE SUPERIMPOSING TIME |
| ⋮ | ⋮ |
| N. A DISPLAY TIME FOR AN OBJECT IS SET COMPLETELY EXCESSIVE THE WHOLE DISPLAY TIME RANGE | PROCESS 1 FOR THAT OBJECT |

U.S. PATENT DOCUMENTS

| | | | |
|---|---|---|---|
| 6,215,503 B1 * | 4/2001 | Snyder et al. | 345/629 |
| 6,266,064 B1 * | 7/2001 | Snyder | 345/421 |
| 6,266,068 B1 * | 7/2001 | Kang et al. | 345/629 |
| 6,317,128 B1 * | 11/2001 | Harrison et al. | 345/629 |
| 6,320,580 B1 * | 11/2001 | Yasui et al. | 345/421 |
| 6,356,281 B1 * | 3/2002 | Isenman | 345/629 |
| 6,421,736 B1 * | 7/2002 | Breslau et al. | 709/315 |
| 6,456,285 B2 * | 9/2002 | Hayhurst | 345/422 |

FOREIGN PATENT DOCUMENTS

| | | |
|---|---|---|
| JP | 07-244571 | 9/1995 |
| JP | A 9-167124 | 6/1997 |
| JP | 10171730 A | 6/1998 |
| WO | WO 95/23371 | 8/1995 |

* cited by examiner

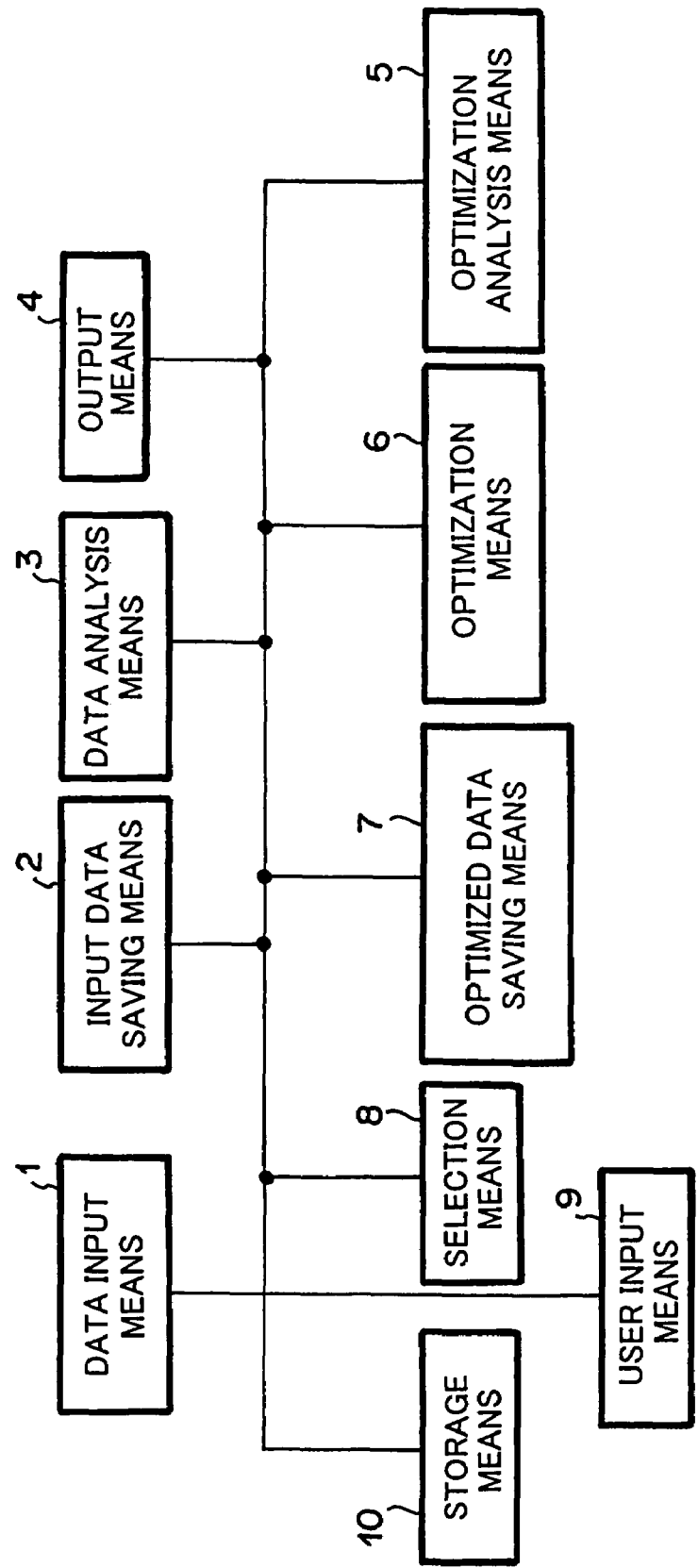

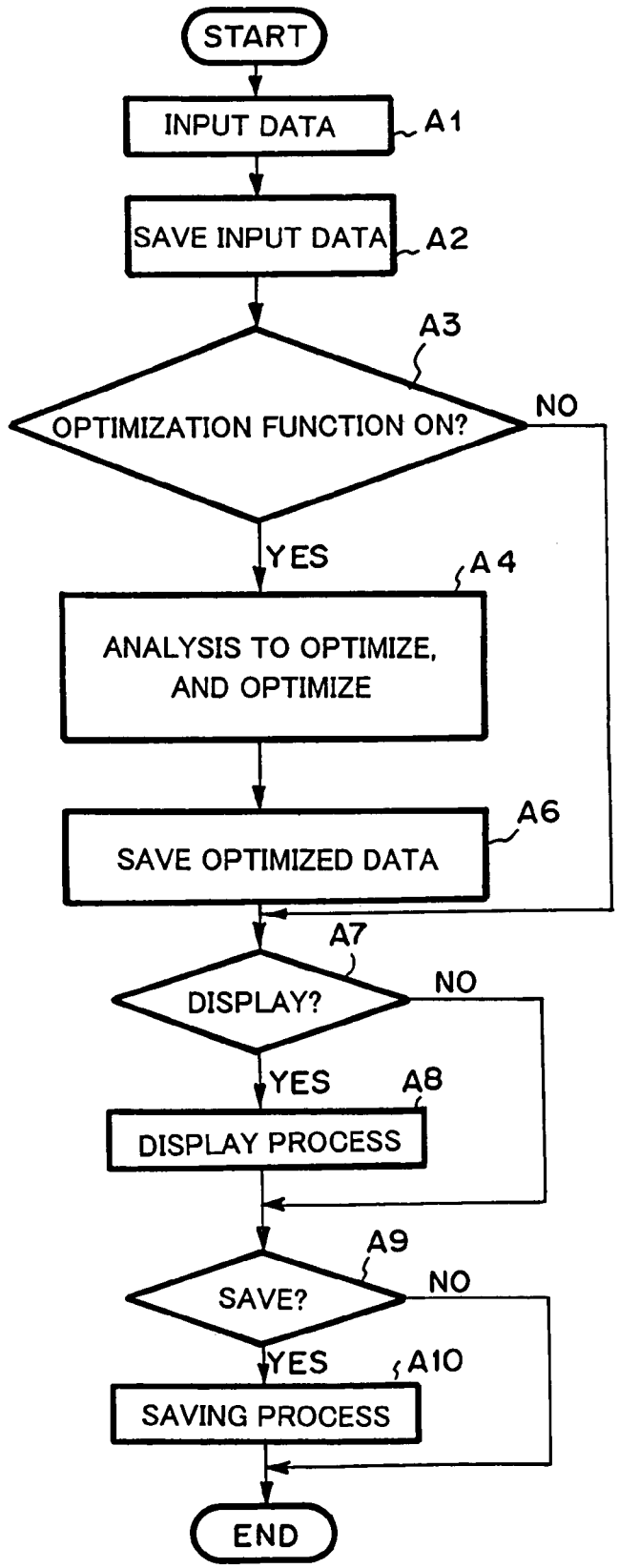

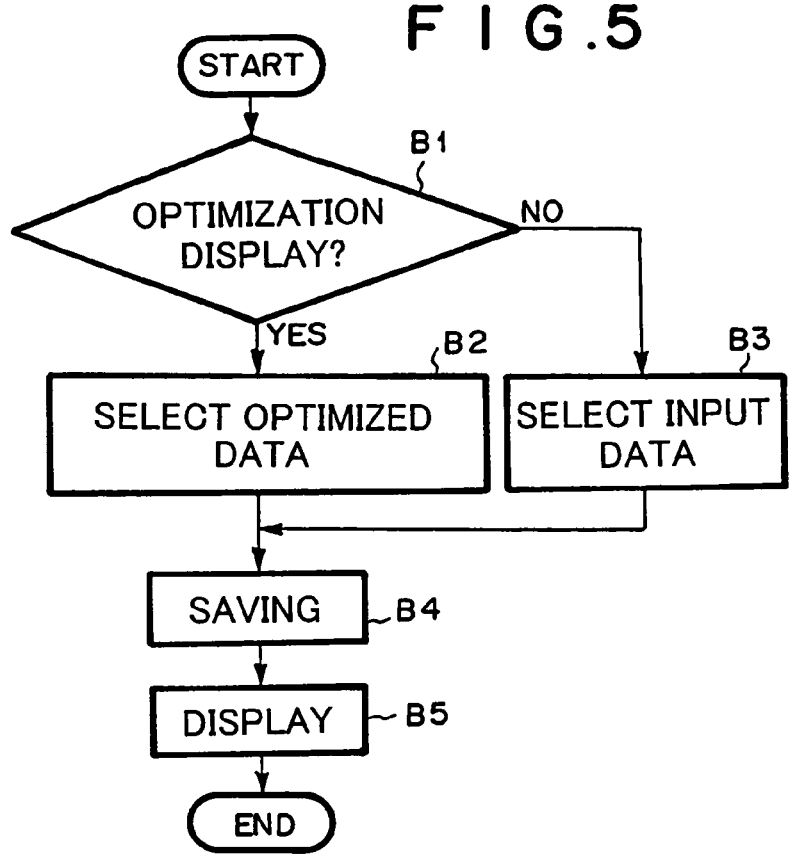
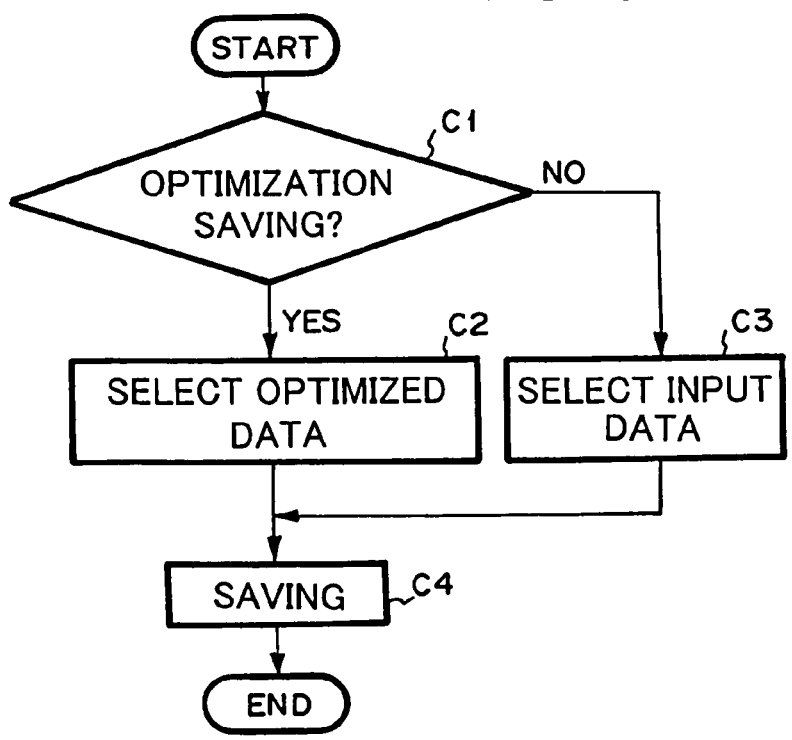

FIG.7

USE OF OPTIMIZATION FUNCTION 51

● ON        ○ OFF

USE FOR DISPLAY  ● ON
                 ○ OFF

USE FOR SAVING   ○ ON
                 ● OFF

F I G. 8  61

| OPTIMIZATION ANALYSIS CONTENTS | METHOD AND PROCESS NUMBERS |
|---|---|
| 1. PLURAL OBJECTS SUPERIMPOSE, DISPLAY TIMES FOR OTHER OBJECTS ARE COMPLETELY INCLUDED WITHIN A DISPLAY TIME FOR THE UPPER MOST OBJECT, A SIZE OF THE UPPER MOST OBJECT IS LARGER THAN SIZES OF OTHER OBJECTS, AND THE UPPER MOST OBJECT HIDES OTHER OBJECTS EVEN CONSIDERING DISPLAY LOCATIONS | |
| 1-1. THE UPPER MOST OBJECT IS NOT TRANSPARENT NOR TRANSLUCENT | PROCESS 1 FOR OTHER OBJECTS |
| 1-2. IF THE UPPER MOST OBJECT IS TRANSPARENT OR TRANSLUCENT, THEN REMOVING THE UPPER MOST OBJECT AND ANALYZING THE ANALYSIS CONTENTS 1 FOR THE REMAINING PLURAL OBJECTS | |
| 2. PLURAL OBJECTS SUPERIMPOSE IN TIME AND SPATIALLY, AND THE UPPER MOST OBJECT IS TRANSPARENT OR TRANSLUCENT | |
| 2-1. A MOTION PICTURE IS CONTAINED | PROCESS 2 FOR ALL OBJECTS OVER THE ENTIRE SUPERIMPOSING TIME |
| 2-2. NO MOTION PICTURE IS CONTAINED | PROCESS 3 FOR ALL OBJECTS OVER THE ENTIRE SUPERIMPOSING TIME |
| ⋯ | ⋯ |
| N. A DISPLAY TIME FOR AN OBJECT IS SET COMPLETELY EXCESSIVE THE WHOLE DISPLAY TIME RANGE | PROCESS 1 FOR THAT OBJECT |

FIG. 9

| PROCESS NUMBERS | OPTIMIZATION PROCESS CONTENTS |
|---|---|
| PROCESS 1 | DELETING OBJECT |
| PROCESS 2 | MAKING OVER A MOTION PICTURE CONSISTING OF PLURAL SUPERIMPOSED OBJECTS INTO A NEW MOTION PICTURE |
| PROCESS 3 | MAKING OVER A STILL PICTURE CONSISTING OF PLURAL SUPERIMPOSED OBJECTS INTO A NEW STILL PICTURE |
| .... | .... |
| PROCESS N | CONTENTS N |

71

F I G. 10  ~81

<START OF DATA>
<DISPLAY ALL OF THE FOLLOWING DATA FROM 0 TO 10 MIN.>
<STILL PICTURE FILE AAA, DISPLAY FROM 5 MIN. TO 10 MIN., COORDINATES (10, 10), SIZE 20 × 30, PRIORITY 2>
<TEXT FILE BBB, DISPLAY FROM 7 MIN. TO 9 MIN., COORDINATES (10, 10), SIZE 10 × 10, PRIORITY 3>
<MOTION PICTURE FILE CCC, DISPLAY FROM 5 MIN. TO 10 MIN., COORDINATES (10, 10), SIZE 20 × 40, PRIORITY 1, TRANSLUCENT>
<MOTION PICTURE FILE DDD, DISPLAY FROM 15 MIN. TO 20 MIN., COORDINATES (0, 0), SIZE 10 × 10, PRIORITY 1>
<END OF DATA>

F I G. 11  ~91

<START OF DATA>
<MOTION PICTURE FILE XXX, DISPLAY FROM 5 MIN. TO 10 MIN., COORDINATES (10, 10), SIZE 20 × 40, PRIORITY 1>
<END OF DATA>

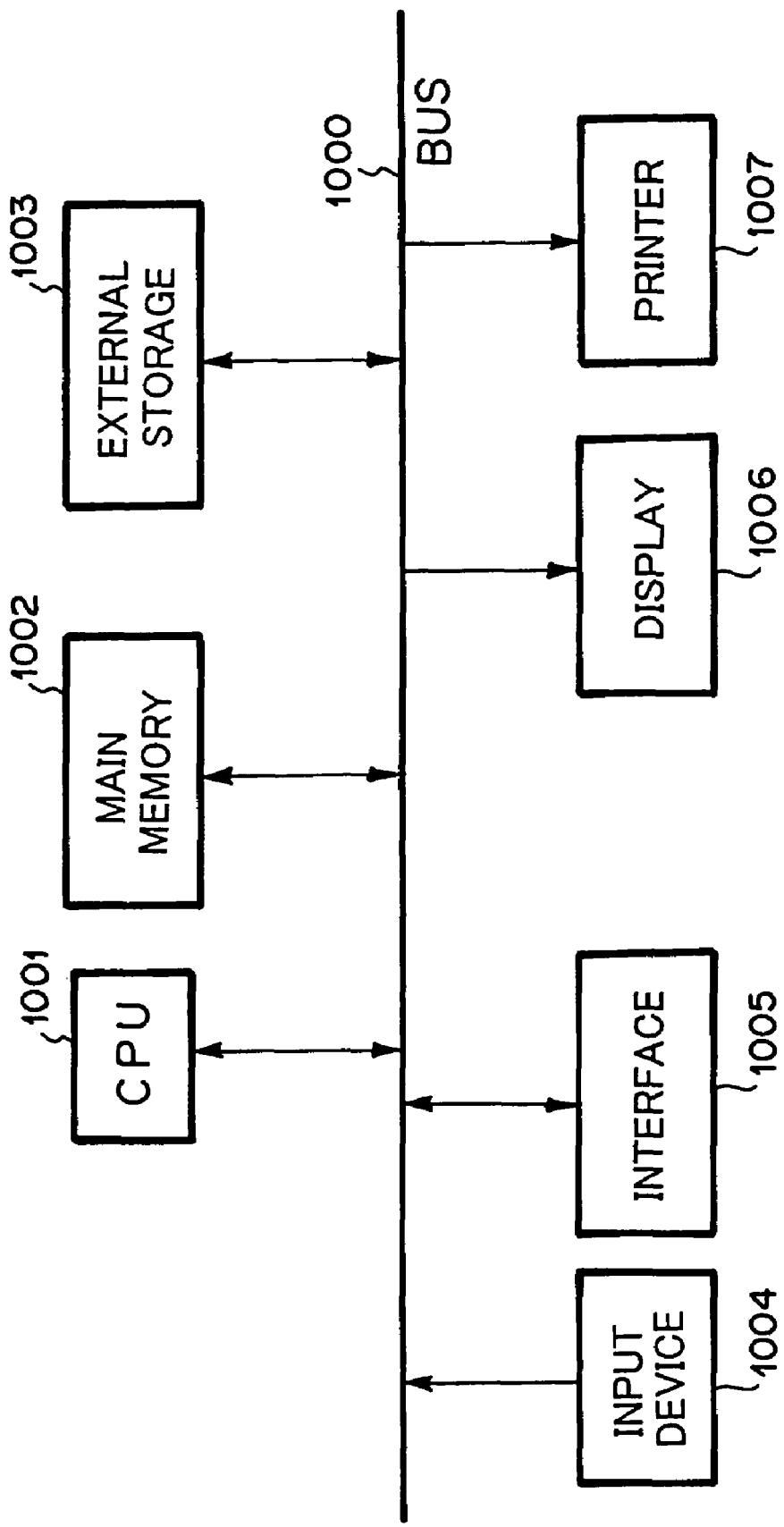

APPARATUS AND METHOD FOR CONVERTING AN OBJECT DISPLAY DESCRIPTION DOCUMENT

BACKGROUND OF THE INVENTION

1. Field of the Invention

The present invention relates to an apparatus and method for converting an object display description document having functions of spatial synchronization and time synchronization and more particularly, to an apparatus and method for converting an object display description document in conformity with such a standard as MHEG (Multimedia and Hypermedia Expert Group)-5, DHTML (Dynamic Hyper Text Markup Language), and SMIL (Synchronized Multimedia Integration Language).

2. Description of the Prior Art

JPA 9-503088 entitled "APPARATUS AND METHOD FOR BROWSING INFORMATION" discloses a conventional system for optimizing data obtained at a viewer or browser for a document described with an object display description language.

As shown in FIG. 1, this reference exemplifies information browsing system 101 for browsing and organizing information from plural information sources 123. Knowledge base 109, which includes information source description 113, worldview 115 and system network view 117, is used for establishing a query plan including a sub plan. When the query sub plan is executed, the query plan is optimized by pruning redundant sub plans in accordance with information browsed by the executed sub plan. Graphical user interface 103 includes a hypertext browser integrated at a knowledge base browser/editor. Graphical user interface 103 allows a user to store an information source description in knowledge base 109 via a graphic operation and to browse information source descriptions previously stored. System 101 provides the use of query results that are constructed for avoiding of inquiring on constructed information sources and of concentrating queries from hypertext browsers on associated data sources that are not constructed. According to the above method, such an object is attained that information needless to inquire is fetched from the information source as seldom as possible.

With respect to an arrangement of sending optimized data from a server, JPA 10-171730 entitled "METHOD OF TRANSFERRING IMAGE" discloses an image transfer method capable of reducing the network load to transfer image data when a high resolution data is required at a client. As shown in FIG. 2, data received at the client is converted into an optimized high-resolution image using image conversion plug-in module 308. In this case, screen resolution setting program 306 is employed to check a resolution of a display device at the client. The result from program 306 is sent to image conversion program 304. The sent data becomes the most easy-to-view and high-qualified image at a browser watched from a reader. Although the optimization at the server side is considered in such a manner, all of servers do not send optimized data. Thus, users are required to display or store received data.

The above conventional technology has the following disadvantages.

A first disadvantage may be caused when the user selects necessary data with reference to its contents and obtains minimal necessary data while the minimal data contains data unnecessary to output or display for the user to the last. In such a case, the viewer or browser is loaded to work for analyzing and displaying the data unnecessary for showing the user. Therefore, a display output is delayed, and a data capacity is increased in case of storing data that also includes unnecessary data.

This is because the conventional viewer/browser has been developed to interpret the data sent from the server and make a display output. Therefore, thus configured viewer/browser analyzes all the obtained data and makes a display output even if all of the data are not required to be displayed because of introduced functions of spatial synchronization and time synchronization.

A second disadvantage is that although the server optimizes individual object data including an image as far as possible, the server does not perform optimization in consideration of a combination of data to be displayed. In this case, the data simply becomes a motion picture (object) group with a plurality of motion pictures (objects) but does not become substantially optimized data when images overlap with each other as the whole data.

This is because the server can superimpose the motion pictures and the like at the same time by the functions of spatial synchronization and time synchronization. In addition, when the server makes data to send, it sends the data with information, which indicates superimposition of the corresponding plural motion pictures, to the user.

SUMMARY OF THE INVENTION

In order to overcome the aforementioned disadvantages, the present invention has been made and has an object to provide an apparatus and method for converting an object display description document, capable of reducing load for displaying an image and reducing a capacity necessary for storing document data, and a browser including the apparatus.

According to a first aspect of the present invention, there is provided an apparatus for converting an object display description document, comprising a generating means for generating, from a set of source objects in the document, a set of new objects fewer than said set of source objects, to obtain a display image equivalent to the display image obtained from said set of source objects.

According to a second aspect of the present invention, there is provided a method for converting an object display description document, comprising a generation step of generating, from a set of source objects in the document, a set of new objects fewer than said plurality of source objects, to obtain a display image equivalent to the display image obtained from said set of source objects.

According to a third aspect of the present invention, there is provided a computer program for causing a computer to execute a method for converting an object display description document, said method comprising a generation step of generating, from a set of source objects in the document, a set of new objects fewer than said set of source objects, to obtain a display image equivalent to the display image obtained from said plurality of source objects.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 3 is a block diagram showing a structure of an object display description document converter and image browser according to an embodiment of the present invention;

FIG. 4 is a flowchart showing an operation of the object display description document converter and image browser according to the embodiment of the present invention;

FIG. 5 is a flowchart explaining a detailed operation of display process A8 shown in FIG. 4;

FIG. 6 is a flowchart explaining a detailed operation of saving process A10 shown in FIG. 4;

FIG. 7 shows a screen for selecting the use of an optimization function employed at a selecting means 8 and user input means;

FIG. 8 is a table showing the optimization analysis contents analyzed by an optimization analysis means 5 of FIG. 3 and methods and process numbers corresponding to the analysis contents;

FIG. 9 is a table showing the contents of an optimization process executed by an optimization means 6 of FIG. 3;

FIG. 10 exemplifies an input object display description document input from a data input means 1 of FIG. 3;

FIG. 11 exemplifies an optimized object display description document produced from the optimization analysis means 5 and optimization means 6 based on the input object display description document shown in FIG. 10; and FIG. 12 is a block diagram showing another structure of an object display description document converter and image browser according to an embodiment of the present invention;

DETAILED DESCRIPTION OF THE PREFERRED EMBODIMENTS

Figure 1:
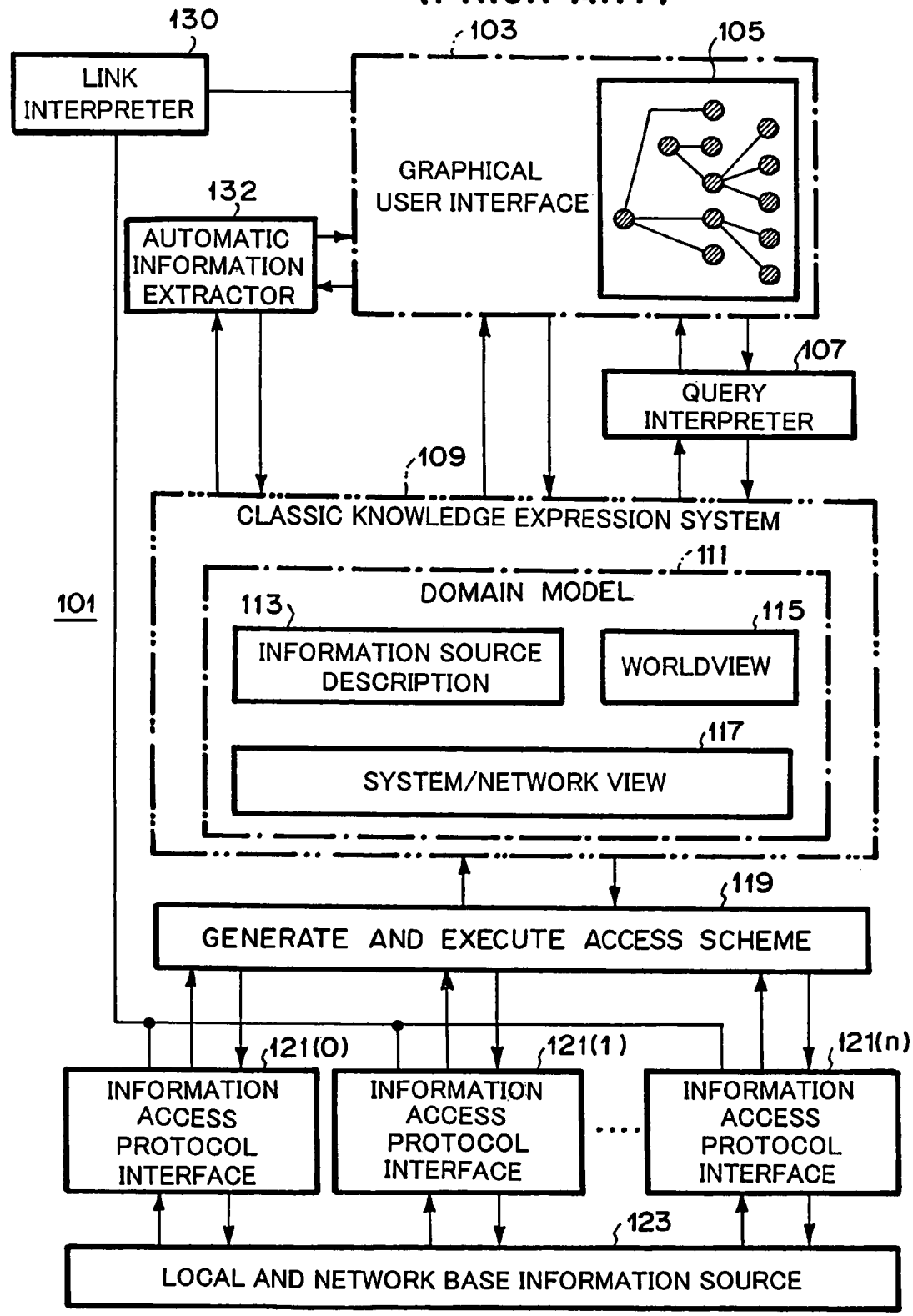
FIG. 1 is a block diagram showing a conventional technology.
Figure 2:
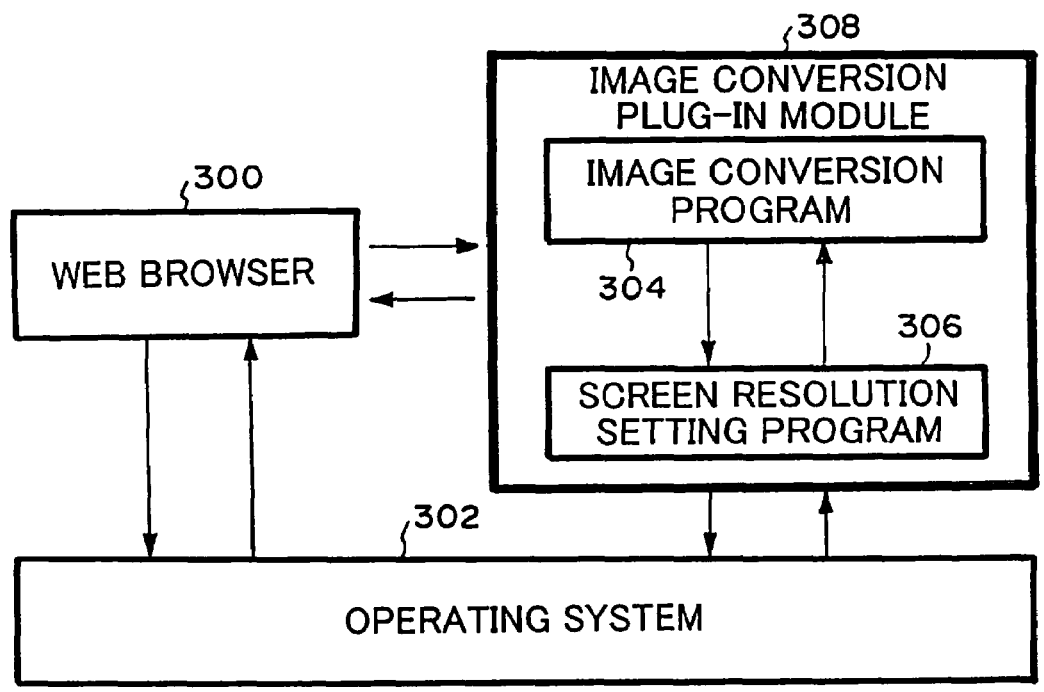
FIG. 2 is a block diagram showing another conventional technology.

In case where a user (client) displays data sent from a sender (server) at a browser or viewer, or the user stores the data, the present invention automatically optimizes the data sent from the sender after it is input. Thus, the present invention provides a system configuration capable of displaying the same contents as the incoming data at a higher speed and of storing the incoming data to a storage with smaller data capacity.

FIG. 3 is a block diagram of an embodiment of the present invention. FIG. 3 shows such a viewer system, in which data input from data input means 1 is saved in input data saving (temporary storing) means 2, then analyzed by data analysis means 3, and output for display from output means 4. The system further comprises optimization analysis means 5, optimization means 6, optimized data saving (temporary storing) means 7, selection means 8, user input means 9 and storage (proper storing) means 10.

Selection means 8 allows the user to select whether or not to work an optimization function. When the user selects from user input means 9 to put on the optimization function, optimization analysis means 5 analyzes if there is a portion capable of being optimized in the data saved in input data saving means 2. Optimization means 6 performs an optimization process and thereafter saves optimized data into optimized data saving means 7. In case of displaying the saved data, it is analyzed by data analysis means 3 and displayed at output means 4. In case of storing the saved data, it is stored in storage means 10. When the user selects to put off the optimization function, the input data is analyzed by data analysis means 3 and displayed at output means 4 or stored in storage means 10. The optimization processes herein mean optimization processes corresponding to the time synchronization/spatial synchronization, which include a process for deleting objects hidden behind the other object that is spatially displayed at the uppermost location and hides the objects to be deleted in time and spatially, for example. It also includes a process for deleting an object to be displayed in a range exceeding a time for display in time, and a process for making one motion picture object from plural superimposed motion picture objects.

Thus, by automatically optimizing the obtained data at the viewer or browser to improve the data in consideration of display by the viewer or browser, the very same contents as the obtained data can be displayed at a high speed and stored in compact.

FIG. 3 is a block diagram of an embodiment of an automatic optimization display and storing system according to the present invention. The system comprises data input means 1, input data saving means 2, data analysis means 3 and output means 4, optimization analysis means 5, optimization means 6, optimized data saving means 7, selection means 8, user input means 9, and storage means 10.

An operation of each part will be described next.

Data input means 1 inputs data of contents. Input data saving means 2 saves the input data. Data analysis means 3 analyzes the data based on a format with which the data was produced. Output means 4 displays or prints out the analyzed data. Optimization analysis means 5 performs an analysis for searching data to optimize and optimization means 6 optimizes the data. Optimization analysis means 5 and optimization means 6 operate in multi-process in association with each other. Optimized data saving means 7 saves the optimized data. Selection means 8 outputs information associated with allowing the user to select whether or not to employ the optimization as a function and reflects the user's selection. User input means 9 accepts the selection input that indicates whether the user employs the optimization function from the user. Storage means 10 stores the data and is such as a hard drive and the like.

The whole operation of the embodiment will be described in detail with reference to FIGS. 3 and 4 next.

First, it is executed to input data from data input means 1 (at step A1). Next, it is executed to save the input data in input data saving means 2 (at step A2).

The optimization function has been previously selected to put on or off by the user from selection means 8 and user input means 9. If the user selected to put on the optimization function (YES at step A3), optimization analysis means 5 and optimization means 6 operate in association with each other so that optimization analysis means 5 searches data to be optimized among the data saved in input data saving means 2 and optimization means 6 optimizes the data to be optimized (at step A4). When optimization analysis means 5 finally detects that no data remains to be optimized, the optimized data is saved in optimized data saving means 7 (at step A6). If the user selected to put off the optimization function (NO at step A3), steps A4 and A6 are omitted. Next, it is executed to determine to display or not (at step A7). If determined to display, a display process is performed (step A8). If determined not to display, the process advances to a determination of saving (at step A9). If determined to save, a saving process is performed (at step A10) and then the process ends. If determined not to save, the process directly ends.

An embodied example will be described next.

FIG. 5 is a flowchart of an embodied example of display process A8. FIG. 6 is a flowchart of an embodied example of saving process A10. FIG. 7 shows an example of a screen for use in allowing the user to select ON or OFF of the optimization function. FIG. 8 shows an embodied example of the contents to be analyzed at optimization analysis means 5.

FIG. 9 shows an embodied example of the contents of process executed at optimization means 6. FIG. 10 exemplifies the data saved in input data saving means 2. FIG. 11 exemplifies the data saved in optimized data saving means 7.

The case where the optimization function is OFF will be described first employing an embodied example. It is executed to input data from data input means 1 (A1). The input data, which is referred with numeral 81 as shown in FIG. 10, includes:

<Start of data>

<Display all of the following data from 0 to 10 min.>

<Still picture file AAA, Display from 5 min. to 10 min., Coordinates (10, 10), Size 20×30, Priority 2>

<Text file BBB, Display from 7 min. to 9 min., Coordinates (10, 10), Size 10×10, Priority 3>

<Motion picture file CCC, Display from 5 min. to 10 min., Coordinates (10, 10), Size 20×40, Priority 1, Translucent>

<Motion picture file DDD, Display from 15 min. to 20 min., Coordinates (0, 0), Size 10×10, Priority 1>

<End of data>

Input data saving means 2 saves this data (A2). If the optimization function is OFF (NO at A3), then the process advances to the determination of display (A7). If the display is not required, then the process advances to the determination of saving (A9). If the display is required, then the display process is performed (A8).

FIG. 5 shows a flow of display process A8. As the optimization display is OFF (NO at B1), it is executed to directly select the input data from input data saving means 2 (B3). Then, it is executed to analyze the input data by data analysis means 3 (B4) and to display the analyzed data at output means 4 (B5).

In this case, data analysis means 3 analyzes the data contents of <Start of data> as that "data starts here". It also analyzes the data contents of <Display all of the following data from 0 to 10 min.> as that "start to display the whole contents from here at 0 min. and finish to display at 10 min.". It further analyzes the data contents of <Still picture file AAA, Display from 5 min. to 10 min., Coordinates (10, 10), Size 20×30, Priority 2> as that "display a still picture file AAA on a location at coordinates (10, 10) with a size of 20×30 from 5 min. to 10 min. with the second priority from the top". It also analyzes the data contents of <Text file BBB, Display from 7 min. to 9 min., Coordinates (10, 10), Size 10×10, Priority 3> as that "display a text file BBB on a location at coordinates (10, 10) with a size of 10×10 from 7 min. to 9 min. with the third priority from the top". It further analyzes the data contents of <Motion picture file CCC, Display from 5 min. to 10 min., Coordinates (10, 10), Size 20×40, Priority 1, Translucent> as that "display a motion picture file CCC in translucent on a location at coordinates (10, 10) with a size of 20×40 from 5 min. to 10 min. with the first priority from the top". It also analyzes the data contents of <Motion picture file DDD, Display from 15 min. to 20 min., Coordinates (0, 0), Size 10×10, Priority 1> as that "display a motion picture file DDD on a location at coordinates (0, 0) with a size of 10×10 from 15 min. to 20 min. with the first priority from the top". Data analysis means 3 further analyzes the data contents of <End of data> as that "data finishes here" and output means 4 displays the contents of these analyzed results. Next, it is executed to advance to the saving process determination (A9). If not required to save, then a series of process finishes. If required to save, then the process advances to the saving process (A10). FIG. 6 provides a flowchart showing saving process A10. As the optimization saving is determined NO (C1), it is executed to select the data from input data saving means 2 (C3) and to store the selected data into storage means 10 (C4). Then, the storing process finishes and the series of process terminates.

An embodied example of the case where the optimization function is ON will be described next. FIG. 7 is an imaging diagram of user display message 51 for allowing the user to select ON or OFF of the optimization function through selection means 8 from user input means 9. In this case, "Use of optimization function" is selected ON, "Use for display" ON, and "Use for saving" OFF. The data denoted with reference numeral 81 of FIG. 10 is input from data input means 1 (A1) and saved in input data saving means 2 (A2). Then, the process advances to YES through determining if the optimization function being ON (YES at A3). Optimization analysis means 5 analyzes to optimize and optimization means 6 performs the optimization process. An embodied example of the optimization analysis performed by optimization analysis means 5 is shown in FIG. 8 with reference numeral 61, by which the contents are analyzed in consideration of time synchronization and spatial synchronization.

If the analysis contents are that "1. Plural objects superimpose, display times for other objects are completely included within a display time for the uppermost object, a size of the uppermost object is larger than sizes of other objects, and the uppermost object hides other objects even considering display locations", 1-1 or 1-2 is adaptive:

1-1. If the uppermost object is not transparent nor translucent, then Process 1 is selected for other objects (see FIG. 9); and 1-2. If the uppermost object is transparent or translucent, then it is executed to remove the uppermost object and analyze analysis contents 1 for the remaining plural objects. The term "removing" herein differs from the term "deleting" used in Process 1 and means to remove from objects to be analyzed.

If the analysis contents are that "2. Plural objects superimpose in time and spatially, and the uppermost object is translucent or transparent", 2-1 or 2-2 is adaptive:

2-1. If a motion picture is contained, it is executed to select Process 2 for all objects over the entire superimposing time; and 2-2. If no motion picture is contained, it is executed to select Process 3 for all objects over the entire superimposing time.

If the analysis contents are that "N. A display time for an object is completely in excess of the whole display time range", Process 1 is performed for that object.

FIG. 9 shows an embodied example imaging of the optimization process contents with reference numeral 71, which includes process numbers and corresponding process contents: "Process 1" corresponds to "Deleting object"; "Process 2" to "Making a new motion picture from a motion picture consisting of plural superimposed objects"; "Process 3" to "Making a new still picture from a still picture consisting of plural superimposed objects"; and "Process M" to "Contents M".

The data in the above-embodied example corresponds to the optimization analysis and optimization process (at step A4 in FIG. 4) as below. The optimization analysis contents of the data with numeral 81 in FIG. 10 include three object descriptions:

<Still picture file AAA, Display from 5 min. to 10 min., Coordinates (10, 10), Size 20×30, Priority 2>; <Text file BBB, Display from 7 min. to 9 min., Coordinates (10, 10), Size 10×10, Priority 3>; and <Motion picture file CCC, Display from 5 min. to 10 min., Coordinates (10, 10), Size 20×40, Priority 1, Translucent>. The condition for the data corresponds to "1-2. If the uppermost object is transparent or translucent, then it is executed to remove the uppermost object and analyze analysis contents 1 for the remaining plural objects". Then, it is executed to remove the object at the uppermost priority: <Motion picture file CCC, Display from 5 min. to 10 min., Coordinates (10, 10), Size 20×40, Priority 1, Translucent>, and analyze objects: <Still picture file AAA, Display from 5 min. to 10 min., Coordinates (10, 10), Size 20×30, Priority 2> and <Text file BBB, Display from 7 min. to 9 min., Coordinates (10, 10), Size 10×10, Priority 3> by the analysis contents 1. In this case, the process: "1-1. If the uppermost object is not transparent nor translucent, then selecting Process 1 for other objects" is attached. As a result, the deleting process is performed to the object, <Text file BBB, Display from 7 min. to 9 min., Coordinates (10, 10), Size 10×10, Priority 3>, as the contents of Process 1: "Deleting object" is applied.

The optimization analysis: "2. Plural objects superimpose in time and spatially, and the uppermost object is translucent or transparent", is adapted to two remaining objects: <Still picture file AAA, Display from 5 min. to 10 min., Coordinates (10, 10), Size 20×30, Priority 2> and <Motion picture file CCC, Display from 5 min. to 10 min., Coordinates (10, 10), Size 20×40, Priority 1, Translucent>. When adapting 2-1 or 2-2, the result is that "2-1. A motion picture is contained". Then, "Process 2 for all objects over the entire superimposing time" is performed. The contents of Process 2 are "Making a new moving picture from a moving picture consisting of plural superimposed objects". Then, it is executed to make a new motion picture file XXX by superimposing the translucent motion picture file CCC and the still picture file AAA and make a new object: <Motion picture file XXX, Display from 5 min. to 10 min., Coordinates (10, 10), Size 20×40, Priority 1>.

In spite of the whole display time, <Display all of the following data from 0 to 10 min.> in the input data file with the reference numeral 81, <Motion picture file DDD, Display from 15 min. to 20 min., Coordinates (0, 0), Size 10×10, Priority 1> is included in the described objects. Therefore, this object is adaptive for the analysis contents: "N. A display time for an object is set completely excessive the whole display time range", and corresponds to "Process 1 for that object". Here, the contents of Process 1 is "Deleting object". Therefore, the object: <Motion picture file DDD, Display from 15 min. to 20 min., Coordinates (0, 0), Size 10×10, Priority 1> is deleted.

The optimization is finished at the time of exhausting objects to be applied to the optimization analysis contents during the flow as above, and the optimized data is saved in optimized data saving means 7 (A6). The optimized data has such contents as shown in FIG. 11 with reference numeral 91:

<Start of data>;

<Motion picture file XXX, Display from 5 min. to 10 min., Coordinates (10. 10), Size 10×10, Priority 1>

<End of data>

Next, if it is determined to display the data at the display determination (YES at step A7), the process advances to the display process (step A8). As shown in FIG. 7, since the user selection is the optimization display, the process advances from step B1 to step B2, and it is executed to select the optimized data with reference numeral 91 saved within optimized data saving means 7. Then, data analysis means 3 analyzes the data (at step B4), and output means 4 displays the analyzed data (at step B5).

Next, if it is determined to save the data at the saving determination (YES at step A9), the process advances to the saving process (step A10). Since the user selection is not to perform the optimization saving (saving the optimized data) as shown in FIG. 7, the process advances from step C1 to step C2, and it is executed to read out the input data from input data saving means 2 to store the input data to storage means 10.

As described above, it is realized that the input data is subjected to automatically optimized display instead of direct display and to direct store. The selections of the input data and the optimized data for display and storing can be freely combined.

FIG. 12 is a block diagram showing the second structure of an apparatus for converting object display description document for performing the method for converting object display description document as explained above. The second structure is of a computer.

The second structure comprises CPU 1001, main memory 1002, external storage 1003, input device 1004, interface 1005, display 1006, printer 1007, and bus 1000 connecting CPU 1001, main memory 1002, external storage 1003, input device 1004, interface 1005, display 1006 and printer 1007.

CPU 1001 is such as a microprocessor, a microcomputer, and a DSP. Main memory 1002 is such as a RAM. External storage 1003 is such as a hard drive, an optical disc, and a magnetooptical disc. Input device 1004 is such as a computer mouse, a keyboard, and a data tablet. Interface 1005 is such as a communication interface connected to a Web server through the Internet. The display is such as a CRT, and a LCD.

CPU 1001 functions as data analysis means 3, optimization analysis means 5, and optimization means 6 by executing instructions in a computer program. The computer program has been stored in external storage 1003, and is temporarily loaded in main memory 1002 to be fetched from CPU 1001 at the execution time. Main memory 1002 not only temporally stores the computer program but also functions as input data saving means 2, and optimized data saving means 7. External storage 1003 not only stores the computer program but also functions as storage means 10. Input device 1004 functions as user input means 9. Interface 1005 functions as data input means 1. Display 1006 functions as output means 4 and selection means 8. Printer 1007 functions as output means 4.

As described above, according to the present invention, the following effects are achieved.

A first effect is as below. If the data obtained by the user contains unnecessary data to output or display to the last for the user, the viewer or browser is not required to analyze or display the unnecessary data. Therefore, extra load is not produced and an appropriate display output speed can be achieved. In addition, the obtained data can be stored without the unnecessary data in an appropriate capacity if required. This is because an optimization routine in consideration of time synchronization and spatial synchronization is integrated in the client such as the viewer/browser. Therefore, all data given from the server are not directly output to display at the viewer or browser. In stead, the optimization, for example, deleting is performed to the objects unnecessary to display over time to the last and the objects hidden behind other object. Thus, the optimized data can be displayed or stored.

A second effect is that a motion-picture (object) group consisting of plural superimposed motion-pictures (objects) sent from the server can be displayed at a comfortable speed and a storing capacity can also be reduced. This is because the viewer/browser performs an optimization to make one object from plural objects including motion pictures in consideration of time synchronization and spatial synchronization before display or saving. Thus, a high-speed display and a small data capacity for storage can be achieved.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. An apparatus for converting an original set of source objects by reducing the number of objects required to display a description document, said apparatus comprising a generating means for generating a set of new objects, from said original set of source objects in the document, a number of new objects in said set of new objects being fewer than a number of objects in said original set of source objects, said fewer objects obtaining a display image equivalent to the display of an image obtained from said original set of source objects,
wherein said generating means generates said new objects from a semi-transparent source object and other source objects located at a layer lower than a layer including said semi-transparent source object and spatially overlapping said semi-transparent source object,
wherein said generating means generates a new merged object including at least a first source object having an area and a second source object having an area and superimposed on said first source object.

2. The apparatus as recited in claim 1, wherein said generating means deletes source objects hidden spatially behind another source object which is not semi-transparent.

3. The apparatus as recited in claim 1, wherein generation of said new object from said semi-transparent source object and said other source objects is performed for a time range in which said semi-transparent source object spatially overlaps said other source objects.

4. The apparatus as recited in claim 1, wherein said generating means deletes a source object when a display time for said source object is out of a display time range for said set of source objects.

5. The apparatus as recited in claim 1, further comprising a means for storing said set of new objects to a storage medium.

6. The apparatus as recited in claim 1, further comprising a means for selectively storing said set of source objects or said set of new objects to a storage medium.

7. The apparatus as recited in claim 1, further comprising a means for displaying said set of new objects, wherein said apparatus is used as a browser.

8. The apparatus as recited in claim 1, further comprising a means for selectively displaying said set of source objects or said set of new objects, wherein said apparatus is used as a browser.

9. A method for converting an original set of source objects by reducing the number of objects required to display a description document, said method comprising a step of using a processor to generate a set of new objects, from said original set of source objects in the document, a number of said new objects forming a set of new objects fewer than a number of said source objects forming said original set of source objects, to obtain a display image equivalent to the display image obtained from said set of source objects,
wherein said generation step generates said new objects from a semi-transparent source object and other source objects located at a layer lower than a layer including said semi-transparent source object and spatially overlapping said semi-transparent source object,
wherein said generating step generates a new merged object including at least a first source object having an area and a second source object having an area and superimposed on said first source object.

10. The method as recited in claim 9, wherein said generation step deletes source objects hidden spatially behind another source object which is not semi-transparent.

11. The method as recited in claim 9, wherein generation of said new object from said semi-transparent source object and said other source objects is performed for a time range in which said semi-transparent source object spatially overlaps said other source objects.

12. The method as recited in claim 9, wherein said generation step deletes a source object when a display time for said source object is out of a display time range for said set of source objects.

13. The method as recited in claim 9, further comprising a step of storing said set of new objects to a storage medium.

14. The method as recited in claim 9, further comprising a step of selectively storing said set of source objects or said set of new objects to a storage medium.

15. The method as recited in claim 9, further comprising a step of displaying said set of new objects.

16. The method as recited in claim 9, further comprising a step of selectively displaying said set of source objects or said set of new objects.

17. A storage device having stored thereon a computer program for causing a computer to execute a method for converting an object display description document by reducing the number of objects required for the display, said method comprising a generation step of generating, from an original set of source objects in the document, a set of new objects which are fewer than a number of said objects forming said original set of source objects, in order to obtain a display image equivalent to the display image obtained from said original set of source objects,
wherein said generation step generates new objects from a semi-transparent source object and other source objects located at a layer lower than a layer including said semi-transparent source object and spatially overlapping said semi-transparent source object,
wherein said generating step generates a new merged object including at least a first source object having an area and a second source object having an area and superimposed on said first source object.

18. The storage device program as recited in claim 17, wherein said generation step deletes source objects hidden spatially behind another source object which is not semi-transparent.

19. The storage device as recited in claim 17, wherein generation of said new object from said semi-transparent source object and said other source objects is performed for a time range in which said semi-transparent source object spatially overlaps said other source objects.

20. The storage device program as recited in claim 17, wherein said generation step deletes a source object when a display time for said source object is out of a display time range for said set of source objects.

21. The storage device as recited in claim 17, further comprising a step of storing said set of new objects to a storage medium.

22. The storage device as recited in claim 17, further comprising a step of selectively storing said set of source objects or said set of new objects to a storage medium.

23. The storage device as recited in claim 17, further comprising a step of displaying said set of new objects.

24. The storage device as recited in claim 17, further comprising a step of selectively displaying said set of source objects or said set of new objects.

25. An apparatus for converting an original set of source objects by reducing the number of objects required to display a description document, said apparatus comprising a generating means for generating a set of new objects, from said original set of source objects in the document, a number of new objects in said set of new objects being fewer than a number of objects in said original set of source objects, said fewer objects obtaining a display image equivalent to the display of an image obtained from said original set of source objects, wherein said generating means generates said new objects from a semi-transparent source object and other source objects not semi-transparent and located at a layer lower than a layer including said semi-transparent source object and spatially overlapping said semi-transparent source objects, wherein said generating means generates a new merged object including at least a first source object and a second source object superimposed on said first source object.

26. A method for converting an original set of source objects by reducing the number of objects required to display a description document, said method comprising a step of using a processor to generate a set of new objects, from said original set of source objects in the document, a number of said new objects forming a set of new objects fewer than a number of said source objects forming said original set of source objects, to obtain a display image equivalent to the display image obtained from said set of source objects, wherein said generation step generates said new objects from a semi-transparent source object and other source objects not semi-transparent and located at a layer lower than a layer including said semi-transparent source object and spatially overlapping said semi-transparent source object, wherein said generating step generates a new merged object including at least a first source object and a second source object superimposed on said first source object.

27. A storage device having stored thereon a computer program for causing a computer to execute a method for converting an object display description document by reducing the number of objects required for the display, said method comprising a generation step of generating, from an original set of source objects in the document, a set of new objects which are fewer than a number of said objects forming said original set of source objects, in order to obtain a display image equivalent to the display image obtained from said original set of source objects, wherein said generation step generates new objects from a semi-transparent source object and other source objects not semi-transparent and located at a layer lower than a layer including said semi-transparent source object and spatially overlapping said semi-transparent source object, wherein said generating step generates a new merged object including at least a first source object and a second source object superimposed on said first source object.

\* \* \* \* \*